United States Patent
Godzaridis et al.

(10) Patent No.: US 10,930,087 B2
(45) Date of Patent: Feb. 23, 2021

(54) TECHNIQUES FOR CONCURRENTLY EDITING FULLY CONNECTED LARGE-SCALE MULTI-DIMENSIONAL SPATIAL DATA

(71) Applicant: Bentley Systems, Incorporated, Exton, PA (US)

(72) Inventors: Elenie Godzaridis, Quebec (CA); Luc Robert, Valbonne (FR); Jean-Philippe Pons, Le Rouret (FR); Stephane Nullans, Saint Vallier de Thiey (FR)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/514,585

(22) Filed: Jul. 17, 2019

(65) Prior Publication Data

US 2020/0357189 A1 Nov. 12, 2020

(30) Foreign Application Priority Data

May 7, 2019 (EP) .................................... 19305583

(51) Int. Cl.
*G06T 19/20* (2011.01)
*G01C 11/04* (2006.01)
*G06T 17/20* (2006.01)

(52) U.S. Cl.
CPC .............. *G06T 19/20* (2013.01); *G01C 11/04* (2013.01); *G06T 17/205* (2013.01); *G06T 2200/24* (2013.01); *G06T 2219/004* (2013.01); *G06T 2219/024* (2013.01); *G06T 2219/2004* (2013.01); *G06T 2219/2008* (2013.01)

(58) Field of Classification Search
CPC ............................... G06T 19/20; G01C 11/04
See application file for complete search history.

(56) References Cited

U.S. PATENT DOCUMENTS

| | | | |
|---|---|---|---|
| 7,747,591 B2 | 6/2010 | Chatterjee et al. | |
| 8,732,120 B1 | 5/2014 | Berreirinhas | |
| 10,255,716 B1 | 4/2019 | Godzaridis et al. | |
| 10,255,720 B1 | 4/2019 | Godzaridis et al. | |
| 2001/0056308 A1* | 12/2001 | Petrov | G06T 17/205 700/98 |
| 2005/0280644 A1* | 12/2005 | Ikezawa | G06T 17/00 345/419 |

(Continued)

FOREIGN PATENT DOCUMENTS

WO WO-2013/072647 A1 5/2013

OTHER PUBLICATIONS

Li et al, VSculpt: A Distributed Virtual Sculpting Environment for Collaborative Design, IEEE Transactions on Multimedia, vol. 5, No. 4, Dec. 2003 (Year: 2003).*

(Continued)

*Primary Examiner* — Jitesh Patel
(74) *Attorney, Agent, or Firm* — Cesari and McKenna, LLP; James A. Blanchette

(57) ABSTRACT

In an example embodiment, techniques are provided for concurrently editing fully-connected large-scale multi-dimensional spatial data (e.g., a large-scale 3-D mesh) by ensuring that edits performed by multiple clients are non-conflicting edits that are "trivially" mergeable (e.g. mergeable simply via cut-and-paste operations). Conflicting edits may be prevented by locks (e.g., region-based locks). Non-conflicting edits that require "non-trivial" merging may be prevented through the use of marked read-only boundaries.

23 Claims, 12 Drawing Sheets

(56) References Cited

U.S. PATENT DOCUMENTS

| | | | | |
|---|---|---|---|---|
| 2007/0064005 | A1* | 3/2007 | Antoine | G06T 13/80 345/473 |
| 2012/0233555 | A1* | 9/2012 | Psistakis | G06T 19/00 715/751 |
| 2013/0100130 | A1* | 4/2013 | Crocker | G06T 15/10 345/420 |
| 2013/0135180 | A1 | 5/2013 | McCulloch et al. | |
| 2013/0235045 | A1* | 9/2013 | Corazza | G06T 13/40 345/473 |
| 2014/0317589 | A1 | 10/2014 | Bowman, Jr. et al. | |
| 2015/0049085 | A1* | 2/2015 | Dysvik | G06T 17/20 345/424 |
| 2015/0109296 | A1 | 4/2015 | Panteleev et al. | |
| 2016/0092462 | A1 | 3/2016 | Raj et al. | |
| 2019/0080520 | A1 | 3/2019 | Godzaridis et al. | |

OTHER PUBLICATIONS

Ganovelli, Fabio et al., "OCME: Out-Of-Core Mesh Editing Made Practical," IEEE, IEEE Computer Graphics and Applications, vol. 32, Issue 3, May 12, 2011, pp. 1-10.

Murray, Chuck, et al., "Oracle® Spatial and Graph," Developer's Guide, 12c Release 1 (12.1), E49172-07, Oracle, Jan. 2017, pp. 1-940.

"PostGIS 2.5.0 Manual," Sep. 23, 2018, pp. 1-857.

U.S. Appl. No. 16/440,178, filed Jun. 13, 2019 by Elenie Godzaridis et al. for Locking of Spatial Regions of Large-Scale Fully-Connected Multi-Dimensional Spatial Data for Collaborative Updating, pp. 1-34.

Van Oosterom, Peter, "Maintaining Consistent Topology Including Historical Data in a Large Spatial Database," Jan. 1997, pp. 327-336.

Xu, Xianghua, et al., "Distributed Dynamic-Locking in Real-Time Collaborative Editing Systems," Springer Nature Switzerland AG, Springer Link, International Conference on Collaboration and Technology, Groupware: Design, Implementation, and Use, Proceedings of the 10$^{th}$ International Workshop, CRIWG 2004, San Carlos, Costa Rica, Lecture Notes in Computer Science, vol. 3198. Springer-Verlag, Berlin, Heidelberg, Sep. 5-9, 2004, pp. 271-279.

"European Search Report and Written Opinion," European Application No. 19305583.7-1231, Applicant: Elenie Godzaridis et al., dated Oct. 4, 2019, pp. 1-9.

* cited by examiner

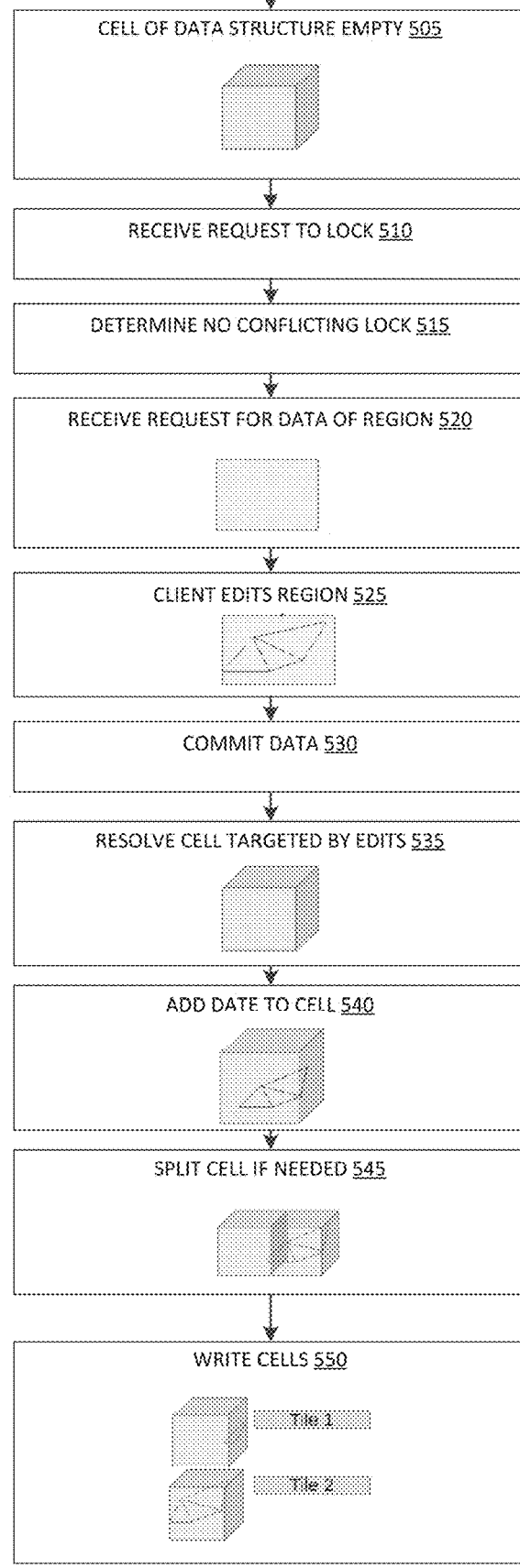

TECHNIQUES FOR CONCURRENTLY EDITING FULLY CONNECTED LARGE-SCALE MULTI-DIMENSIONAL SPATIAL DATA

RELATED APPLICATIONS

The present application claims the benefit of EP Patent Application No. 19 305 583.7 titled TECHNIQUES FOR EDITING FULLY CONNECTED LARGE-SCALE MULTI-DIMENSIONAL SPATIAL DATA, filed on May 7, 2019, the contents of which are incorporated herein in their entirety.

BACKGROUND

Technical Field

The present disclosure relates generally to editing fully-connected multi-dimensional spatial data and more specifically to locking techniques applicable to fully-connected large-scale multi-dimensional spatial data to permit collaborative operation.

Background Information

It may be useful in a variety of software applications for multiple clients (e.g., software programs or human users) to collaboratively operate upon fully-connected large-scale (e.g., potentially infinitely large) multi-dimensional (e.g., two-dimension (2-D), three-dimensional (3-D), four-dimensional (4-D), etc.) spatial data. Such collaborative operation may enable greater concurrency and parallelization of tasks and thereby efficiency, which may be especially important in processor intensive operations.

One type of software application that may benefit from collaborative operation is structure from motion (SfM) photogrammetry applications, such as the ContextCapture™ application available from Bentley Systems, Inc. A SfM photogrammetry application may operate to generate fully-connected large-scale multi-dimensional spatial data (e.g., a large-scale 3-D mesh) composed of faces (e.g., triangles) formed from vertices connected by edges. The 3-D mesh may be generated based on a set of images (e.g., photographs) of the real-world captured by a camera, the generating to include stages of reconstruction, texturing and annotation, and retouching. Reconstruction may involve several stages, including a draft reconstruction stage, refinement stage, and a simplification stage. Texturing and annotation may include a texturing stage that constructs textures to be shown on the faces and a pixel-level mapping state that generates representations for non-visual data to be added. Retouching may include editing based on user-indicated changes to geometry and textures. In at least some of these stages, multiple clients (e.g., software programs operating in an automated manner or in response to user input) may edit the fully-connected large-scale multi-dimensional spatial data (e.g., 3-D mesh). The clients may perform discrete jobs to edit the data, in order to distribute processing burden. While each client may perform its job independently, they may all contribute to the final version of the data.

When multiple clients perform jobs independently that edit the data, there is an issue of concurrent edits. In a most basic existing approach, concurrent editing may be disallowed. A single client may be permitted to edit to the fully-connected large-scale multi-dimensional spatial data (e.g., 3-D mesh) at a time. The whole of the date is edited, and other clients synchronize with the whole data to receive any changes that have been made. While workable, such approach is inefficient. Among other issues, as the size of the fully-connected multi-dimensional spatial data grows, the amount of processing and memory resources required to synchronize with the whole data grows, eventually becoming impractical.

In another existing approach, edit-sets are used to address concurrent editing. When a client desires to edit the data, rather than directly alter the fully-connected large-scale multi-dimensional spatial data (e.g., the large-scale 3-D mesh), the client generates an edit-set that is stored independently of the data. The edit sets describes a series of modifications to be applied to the large-scale multi-dimensional spatial data to effect the desired change. The current state of the data is given by a base data set and a number of edit-sets. The base data set can be read by clients, but edit-sets generally are not comparable to or compatible with each other.

In still another existing approach, editing may be limited by tile boundaries. Fully-connected large-scale multi-dimensional spatial data is often organized into tiles which represent predefined blobs of data (e.g., in the case of a 3-D mesh blobs of triangles or point data) that are typically created for memory optimization purposes. Clients may be permitted to edit different tiles provided they do not overlap or are not adjacent. However, this approach does not fully address the needs of concurrent edits. Often clients desire to edit parts of the data that span several tiles at the same time. Doing so is often difficult as tiles are typically computed independently of each other and are not always topologically connected. As mentioned above, tiles are typically created ahead of time for memory management purposes, not in response to the present needs of clients. Computing systems may not have the necessary resources to simultaneously edit many tiles, and there is often no way to synchronize edits among tiles. Accordingly, editing multiple tiles may lead to data races where data is left in a corrupted state due to conflicting edits.

In yet another existing approach, editing may be limited by individual, localized, units referred to as objects (e.g., in the case of a 3-D mesh an object may be an individual 3D element). Typically, such approaches rely upon the data already being extensively structured, and knowledge of such existing structure is leveraged to allow concurrency. They rely upon database techniques to store and resolve changes to each object. However, if the data lacks extensive structure or clients lack knowledge of the structure, the approach proves unworkable. Object-based approaches often restrict concurrency to different object. Clients are not allowed to simultaneously edit the same object, even if such edits would not conflict. Further, object-based approaches typically do not consider influence of edits of one object to other objects due to connections therebetween. Lack of such consideration may prove problematic, for example, in situations where to stay fully-connected the items of the data (e.g., vertices or edges) need to be affected by changes to neighboring data (e.g., neighboring vertices or edges).

Accordingly, there is a need for improved techniques for concurrently editing fully-connected large-scale multi-dimensional spatial data (e.g., a large-scale 3-D mesh) to permit collaborative operation.

SUMMARY

Techniques are provided for concurrently editing fully-connected large-scale multi-dimensional spatial data (e.g., a large-scale 3-D mesh) by ensuring that edits performed by multiple clients are non-conflicting edits that are "trivially" mergeable (e.g. mergeable simply via cut-and-paste operations and not dependent on order of execution). Conflicting edits may be prevented by locks (e.g., region-based locks). Non-conflicting edits that require "non-trivial" merging may be prevented through the use of marked read-only boundaries and other procedures and conditions.

In one example embodiment, a concurrent editing technique for fully-connected large-scale multi-dimensional spatial data stored in one or more files includes placing a lock (e.g., a region-based lock) for a client on data in the one or more files. The lock may serve to prevent conflicting edits. After the lock, the client may request data of a region of the fully-connected large-scale multi-dimensional spatial data. A process tags at least a boundary contained within the region as read-only, and returns the requested data and tags to the client. Editing is allowed or disallowed based on satisfying one or more conditions, including that the edit is fully contained in the region, the edit is local to a non-overlapping portion of the region if the region overlaps another region of another client, and that the edit does not change tagged faces by modify geometry or topology at the boundary or modifying an existing property at the boundary. This ensures the edit is of a "trivially-mergeable" class. Thereafter, upon receiving a request from the client to commit the edit, the process may readily merge (e.g., cut-and-paste) the committed edit with another edit to the multi-dimensional spatial data in the one or more files, independent of order of execution and other complicating factors.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which:

FIG. 5 is a flow diagram of an example procedure for editing fully-connected large-scale multi-dimensional spatial data to add data to a data structure where none previously existed;

DETAILED DESCRIPTION

Figure 1:
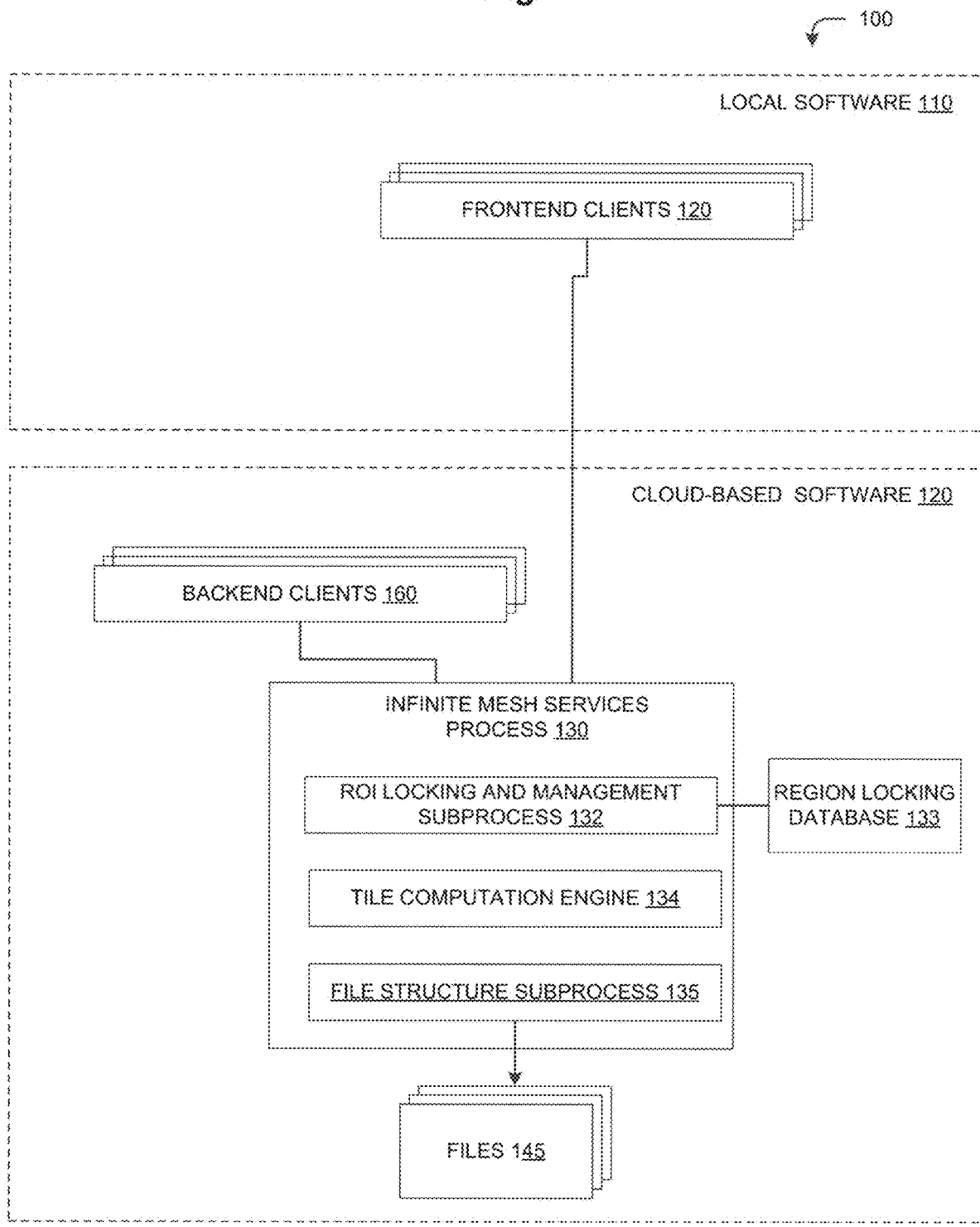
FIG. 1 is a high-level block diagram of an example software architecture for a SfM photogrammetry application that generates fully-connected large-scale multi-dimensional spatial data.

FIG. 1 is a high-level block diagram of an example software architecture 100 for a SfM photogrammetry application that generates fully-connected large-scale multi-dimensional spatial data. In an embodiment, where the fully-connected large-scale multi-dimensional spatial is a large-scale 3-D mesh, the dimensions may be height, width and depth. However, it should be understood that the data may have another numbers of dimensions and such dimensions may represent other information. For example, the data may be 4-dimensional data, with the fourth dimension representing time. In one embodiment, the SfM photogrammetry application operates to generate a large-scale 3-D mesh based on a set of images (e.g., photographs) of the real-world (source data) captured by a camera or cameras (not shown). However, it should be understood that other forms of source data may additionally, or alternatively, be utilized. For example, source data may include data captured by LiDAR, RGB-D cameras, or other types of sensors. The sensors may be static, or mounted to mobile terrestrial or airborne platforms.

The software architecture 100 may be divided into local software 110 that executes on one or more computing devices local to an end-user (collectively "local devices") and cloud-based software 112 that is executed on one or more computing devices remote from the end-user (collectively "cloud computing devices"), accessible via a network (e.g., the Internet). Each computing device may include processors, memory, storage systems, and other hardware (not shown). The local software 110 may include frontend clients 120 each operating on different local devices that provide a user-interface to the SfM photogrammetry application. The frontend clients 120 may display the fully-connected large-scale multi-dimensional spatial data (e.g., 3-D mesh) and perform retouching operations in response to user input. The cloud-based software 112 may include backend clients 160 that perform reconstruction, texturing and annotating operations, as well as other processing intensive operations. To improve performance, the backend clients 160 may each be executed on different cloud computing devices. In some cases, the backend clients 160 may be executed as different threads, such that they operate independently even when executed on the same cloud computing device. The frontend clients 120 and backend client 160 (collectively "clients") may operate concurrently, with multiple clients 120, 160 conducting reads and writes to edit portions of the fully-connected multi-dimensional spatial data (e.g., 3D mesh) in parallel.

An infinite mesh services process 130 functionally organizes the SfM photogrammetry application and provides access to the fully-connected large-scale multi-dimensional spatial data (e.g., the 3D mesh) to clients 120, 160. The infinite mesh services process 130 may include a number of subprocesses including a region of interest (ROI) locking and management process 132 that may maintain a region locking database 133, a tile computation engine 134 that computes, addresses and update tiles, and a file structure process 136 that organizes data of tiles for storage. It should be understood that the infinite mesh services process 130 may also include a large number of other subprocesses, and that these specific subprocess are only mentioned herein for purposes of illustration.

The subprocesses of the infinite mesh services process 130 may operate to store the fully-connected large-scale multi-dimensional spatial data as tiles maintained in files 145. Such storage may be structured according to any of a number of data structures composed of cells. In one implementation, the data structure may take the form of an ambient octree composed of cells, at least some of which correspond to tiles.

Figure 2:
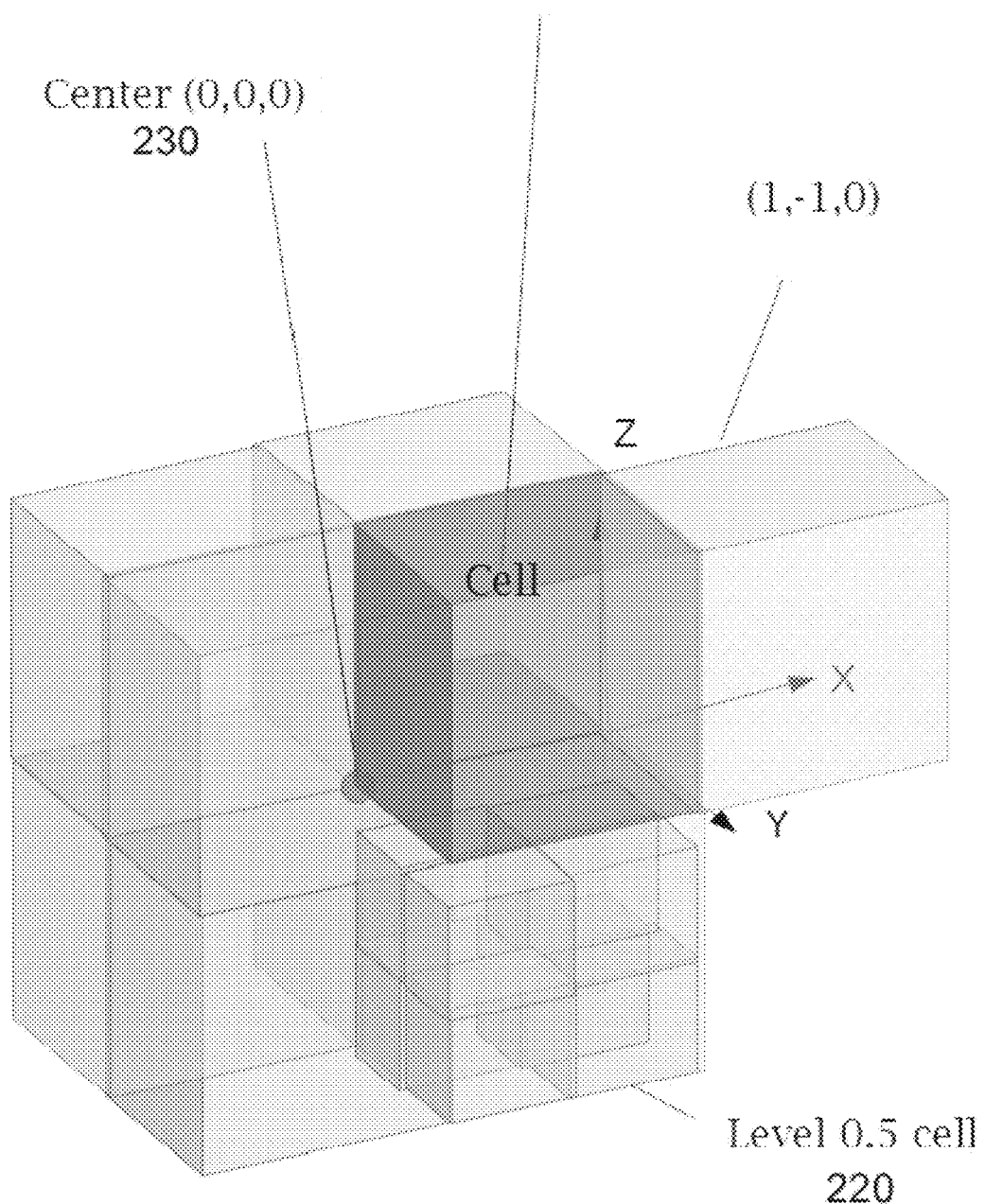
FIG. 2 is a diagram of an example ambient octree that may be used to maintain the fully-connected large-scale multi-dimensional spatial data.

FIG. 2 is a diagram of an example ambient octree that may be used to maintain the fully-connected large-scale multi-dimensional spatial data (e.g., the 3D mesh). The ambient octree is made up of cells (e.g., in the case of a 3D mesh cubic cells) which form a partition in the multi-dimensional space (e.g., 3D space) of the data. Cells may be addressed by coordinates (e.g., three coordinates (i, j, k)) that represent the address of the cell in the multi-dimensional space. An additional parameter (e.g., a parameter (I)) may be associated with the cells to represent a level of the octree at which the cell is located, which indicates its size. For example, a cell 210 may be addressed by coordinates (0,−1, 0) and have a level 1. At each level below the highest level, cells may be half the size in each dimension as the cell immediately above it. For example, cell 220 may be half the size in each dimension than cell 210. Likewise, at each level above the lowest level, cells may be twice the size in each dimension as a cell at the level immediately below them. The center of the octree, may be located at the bottom corner of the cell 230 at coordinates (0,0,0) on level 1. Cells located at coordinates whose absolute value are larger are located further away from the center than cells located at coordinates whose absolute value is smaller.

The fully-connected large-scale multi-dimensional spatial data stored in the ambient octree may be edited by the clients 120,160. In the context of the present disclosure, editing refers to read and write operations that change the data. For example, where the large-scale multi-dimensional spatial data is a large-scale 3D mesh, editing may refer to changing underlying 3D mesh geometry, topology or properties. The geometry of a 3D mesh may be defined by the coordinates (e.g., (x,y,z) coordinates) of its vertices. Each vertex may have a distinct position in 3D Euclidean space such that two vertices may not be located at the same coordinates. The topology of the 3D mesh may be defined by a set of relations between the vertices, such that vertices may be connected by an edge. If three vertices are all linked by edges, they form a face. In many 3D meshes, all faces are triangles except for external faces and holes within the 3D mesh, which instead may be polygons.

Figure 3:
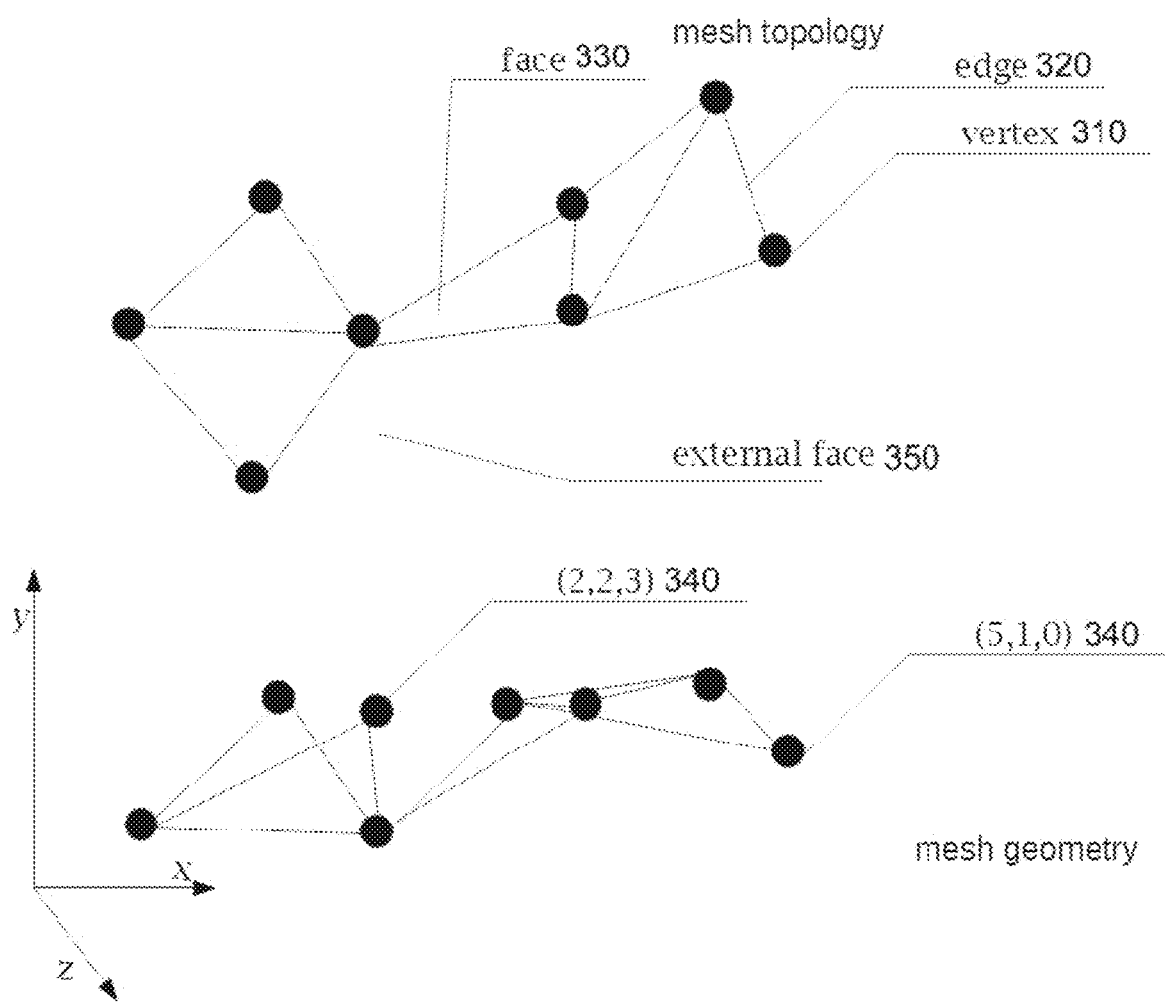
FIG. 3 is a diagram of an example fully-connected 3D mesh, showing a topology defined by vertices that are connected by edges that form faces that define mesh topology.

FIG. 3 is a diagram of an example fully-connected 3D mesh, showing a topology defined by vertices (e.g., 310) that are connected by edges (e.g., 320) that form faces (e.g., 330) that define mesh topology. Also shown are coordinates of vertices that form the mesh geometry (e.g. 340). For purposes of illustration, the example 3D mesh in FIG. 3 is quite small, having a limited number of vertices, edges, faces, coordinates, etc. However, it should be understood that a large-scale 3D mesh, with a much greater number of vertices, edges, faces, coordinates, etc. may be structured similarly.

Figure 4A:
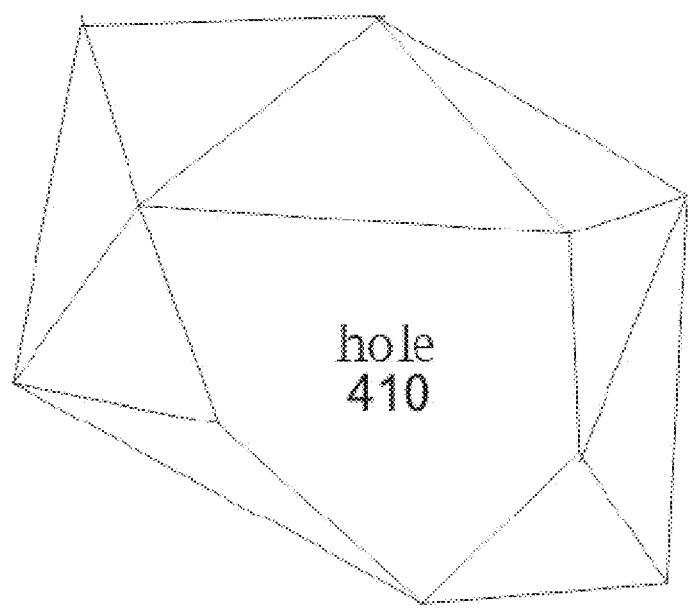
FIG. 4A is a diagram illustrating a hole 410 in an example fully-connected 3D mesh.

Faces at a mesh boundary may be considered external faces (e.g., 350). A hole, in a topological sense, is an external face with the 3D mesh, and in a geometric sense, is a polygon that bounds an area in space within which there is no surface. FIG. 4A is a diagram illustrating a hole 410 in an example fully-connected 3D mesh. As discussed in more detail below, the technique described therein for concurrently editing may be applicable to data with holes.

Figure 4B:
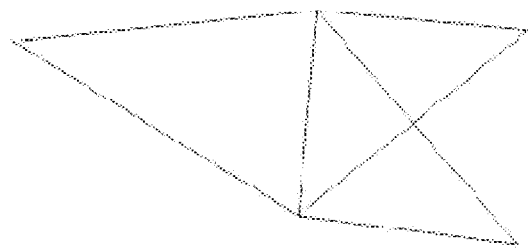
FIG. 4B is a diagram illustrating a non-manifold 3D mesh.

Manifoldness is a property every edge in the mesh is either a part of exactly one or two faces. A mesh is non-manifold if edges may belong to two or more faces. FIG. 4B is a diagram illustrating a non-manifold 3D mesh. The technique described therein for concurrently editing do not directly address non-manifold 3D meshes, however it should be understood that, in alternative embodiments, techniques may be modified to address such cases.

Vertices, edges and faces may all be tagged with properties. Properties may be data that is associated with the respective item, such as a color, material, flag (e.g., a visibility flag), accuracy, classification, etc. Properties may be user defined or derived from other data sources.

Clients 120, 160 may conduct reads and writes to perform various types of edits on fully-connected large-scale multi-dimensional spatial data. In the case of a 3D mesh, edits may include changing part of the mesh geometry, changing part of the mesh topology, changing part of the mesh geometry and mesh topology, and changing mesh properties, among other possibilities. An example of changing part of the mesh geometry is re-labeling vertex coordinates so that they are at a different location. Examples of changing part of the mesh topology include changing edges so that faces are no longer composed of the same edges and vertices, or adding and removing edges and faces. Examples of changing the mesh geometry and mesh topology include adding or removing a sub-mesh, or adding or removing a set of vertices and faces. Examples of changing mesh properties include changing the value of an existing property of a vertex, edge or face, or adding or removing a property from some or all of the vertices, edges or faces of the 3D mesh.

FIG. 5 is a flow diagram of an example procedure for editing fully-connected large-scale multi-dimensional spatial data (e.g., a 3D mesh) to add data to a data structure (e.g., an ambient octree) where none previously existed. The steps of FIG. 5 may be performed by the infinite mesh services process 130, utilizing the ROI locking and management subprocess 132, tile computation engine 134 and the file structure subprocess 136, when not specifically stated to be performed by a client. At step 505, which represents a pre-existing condition, a cell of the data structure (e.g., an ambient octree) is empty. At step 510, a request is received from a client 120 to lock and access data in a region. The region may be defined by a bounding box. At step 515 It is determined whether there is a conflicting lock already in place by consulting the region locking database 133. An existing lock may be considered conflicting if the region (e.g., bounding box) of the existing lock intersects the region (e.g., bounding box) of the request. Since in this case there is only a single client 120, 160 operating, there is no conflicting lock and execution proceeds to step 520, where a request is received from the client for data of the region (i.e. a read), and it is returned that the region is currently empty. At step 525, the client 120, 160 edits the region to add at least some data. Further, at step 530, a request is received from the client 120, 160 to commit the edits (e.g., an edited 3D mesh) to the region. At step 535, the cell of the data structure (e.g., ambient octree) targeted by the edits is resolved. In this example, there is only one cell, which is currently empty. At step 540, the committed edit (e.g., committed edited 3D mesh) is added to the cell of the data structure (e.g., ambient octree). At step 545, a check is performed whether the committed edit causes data to have grown too large for the cell, and, if so, the cell is split and data is pushed to child cells (e.g., two child cells). At step 550, the cells are written to files 145 corresponding to tiles and the lock released.

Figure 6:
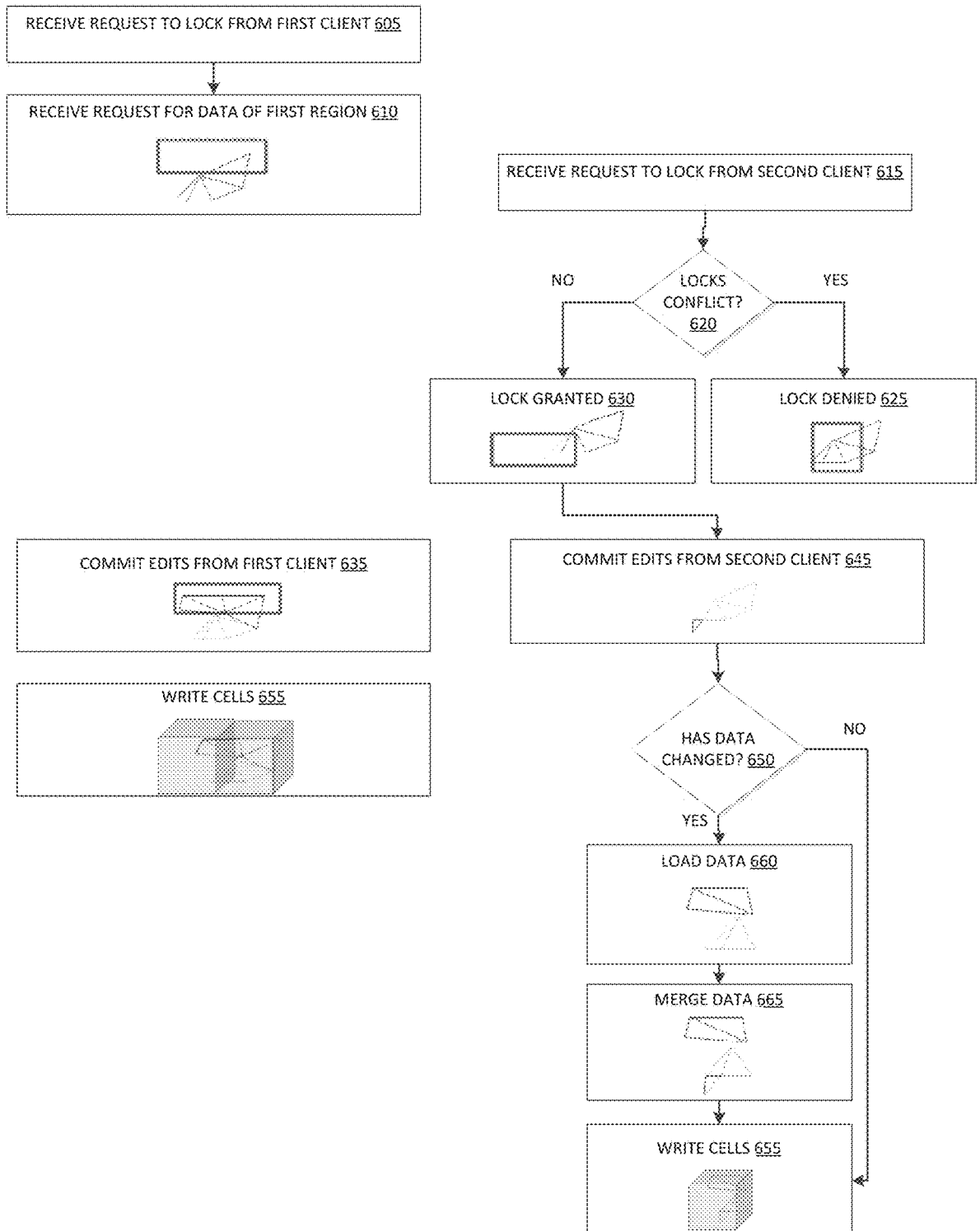
FIG. 6 is a flow diagram of an example procedure for editing fully-connected large-scale multi-dimensional spatial data to update data where there is previously existing data, showing effects of concurrent editing.

FIG. 6 is a flow diagram of an example procedure for editing fully-connected large-scale multi-dimensional spatial data (e.g., a 3D mesh) to update data where there is previously existing data, showing effects of concurrent editing. Again, the steps of FIG. 6 may be performed by the infinite mesh services process 130, utilizing the ROI locking and management subprocess 132, tile computation engine 134 and the file structure subprocess 136, when not specifically stated to be performed by a client. At step 605, a request is received from a first client 120, 160 to lock a first region, which is granted. At step 610, a request for data of the first region is received from a first client and it is supplied. At step 615, a request is received from a second client 120, 160 to lock and access data in a second region. In response to such concurrent request, at step 620, a determination is performed whether the second region intersects with the region of any existing locks, here the lock on the first region. If so, at step 625, the request of the second client for a lock is denied. If not, execution proceeds to step 630, where the lock on the second region is granted, and the second client is permitted to edit the second region.

At step 635, a request is received from the first client 120, 160 to commit edits on the first region. At step 640, the cells of the data structure (e.g., ambient octree) targeted by the edits are resolved, edited to reflect the committed edits from the first client, and any splitting necessitated therefrom is preformed. At step 640, the cells are written to the files 145, competing the edit and the lock is released.

In the middle of this process, a second client may attempt to edit the same cells, however. At step 645, a request is received from the second client 120, 160 to commit the edits on the second region and the cells of the data structure (e.g., ambient octree) targeted by the edits are resolved. At step 650, a determination is made whether the data of those cells has changed. If not, at step 655, the data may simply be written to files 145, completing the edit and the lock may be released. If not, at step 655, new data may be loaded. At step 660, the new data from the second client is merged with the data reflecting the committed edits. Then, execution proceeds to step 655 where the file structure subprocess 136 writes the cells to the files 145.

Concurrent editing operations may fall into three classes: conflicting edits, non-conflicting edits that are trivially merged, and non-conflicting edits requiring non-trivial merging. Conflicting edits may be entirely prevented by used of region-based locking. The merger operations performed as part of step 665 in FIG. 6 may fall into the class of non-conflicting edits requiring "trivial" merging, which can be handled as discussed below. Further, as discussed below, the use of marked read-only boundary regions may avoid non-conflicting edits that requiring "non-trivial" merging.

Figure 7:
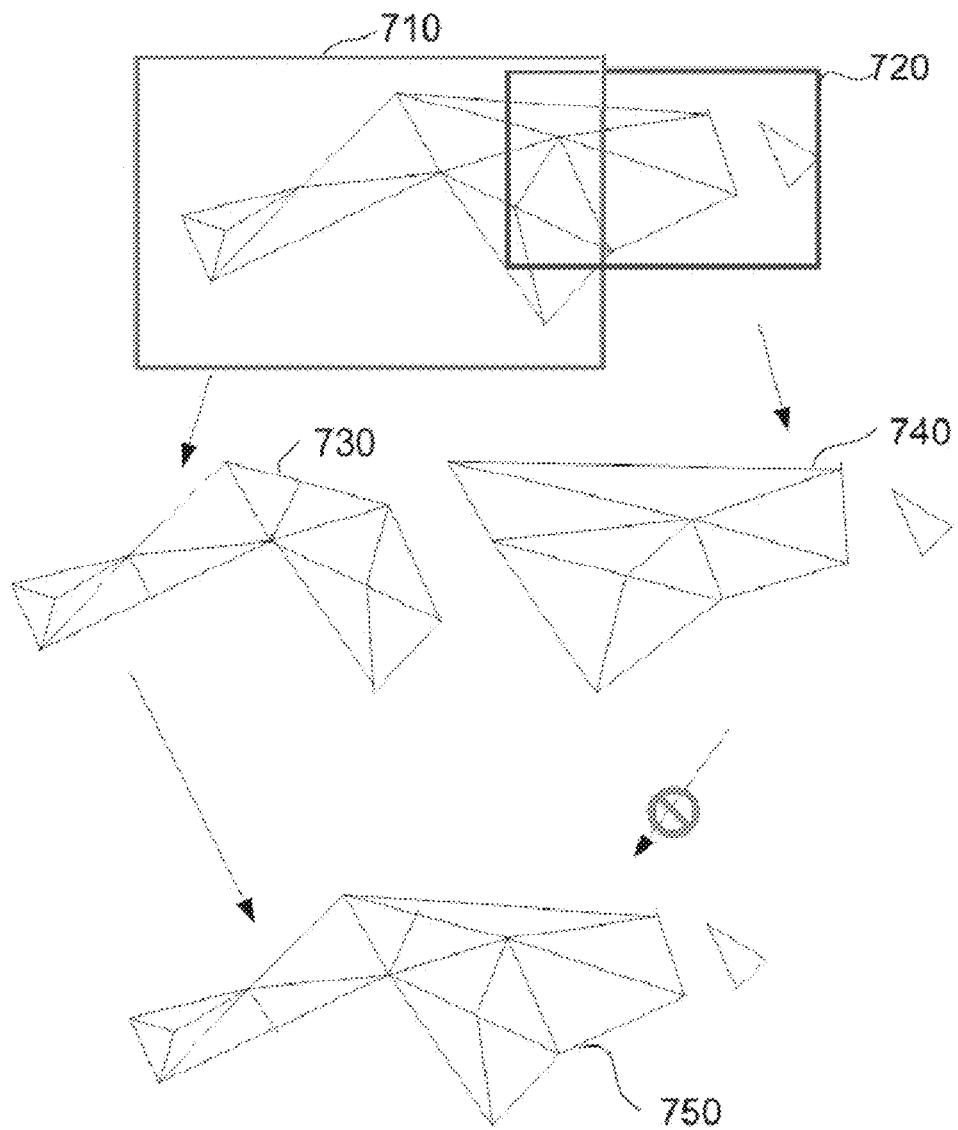
FIG. 7 is a diagram of an example conflicting edit to fully-connected large-scale spatial data that may be prevented by region-based locks.

FIG. 7 is a diagram of an example conflicting edit to fully-connected large-scale spatial data (e.g., a 3D mesh) that may be prevented by region-based locks. A first region 710 edited by a first client 120, 160 is intersected by a second region 720 which a second client 120, 160 desires to edit. In this example, the first client edits the first region to translate the data in space (e.g., such that all vertices of the 3D mesh are translated to the right) 730, while the second client desires to redistribute data in the second region (e.g., such that faces are split and some vertices are moved to create a region of uniform density) 740. If concurrent editing by both clients were allowed, they would attempt to change the same data (e.g., would attempt to change geometry and topology of the same vertices). Region-based locks are employed to accept a request for lock and edits by the first client and reject a request for lock and edits by the second client. The second client may be directed to wait until the first client is complete and then retry requesting a region-based lock and performing the edits, which will then be accepted and yield a final result (e.g., a 3D mesh incorporating both edits) 750.

Figure 8:
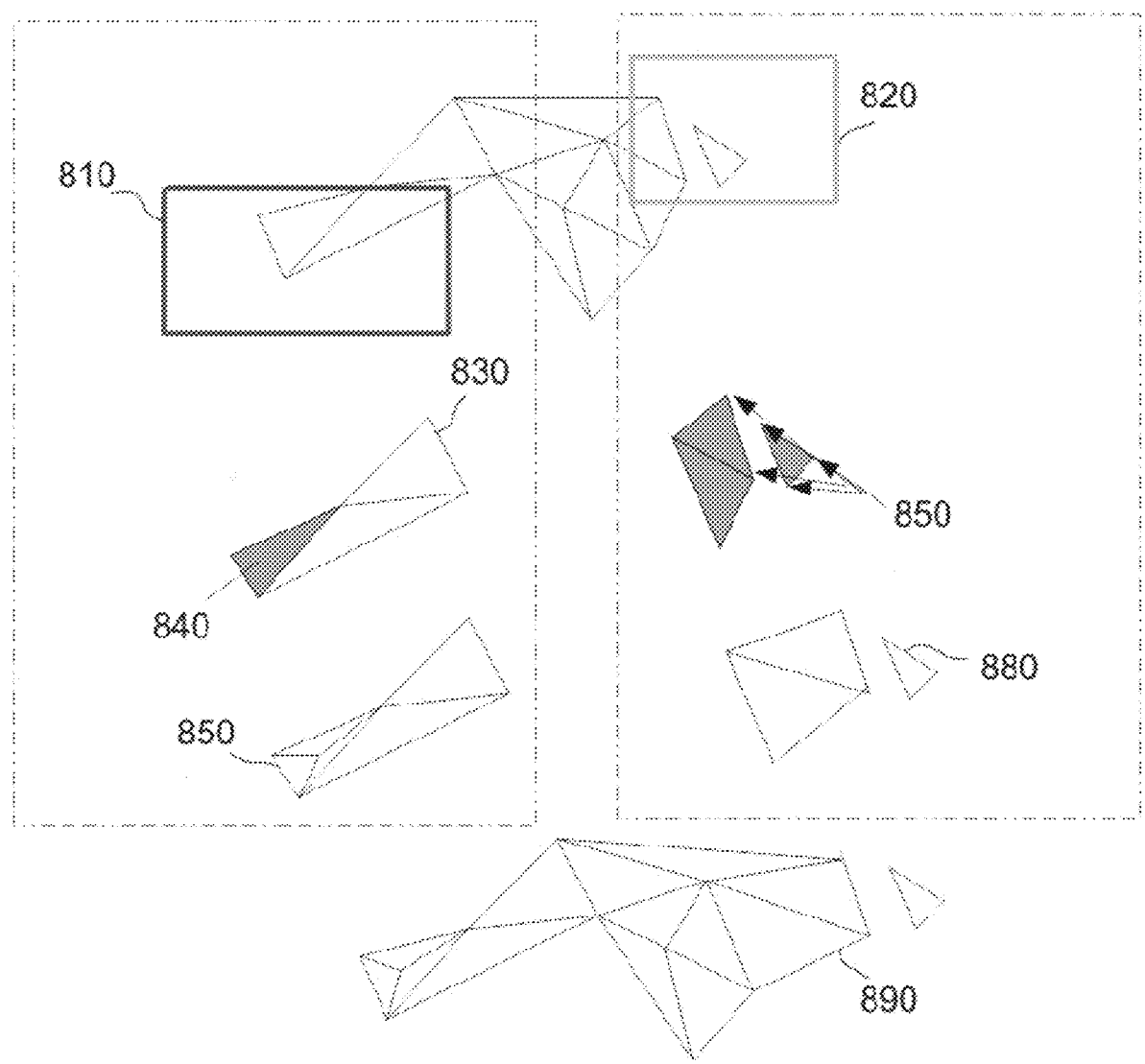
FIG. 8 is a diagram of an example non-conflicting edit to fully-connected large scale spatial data that may be "trivially" merged.

FIG. 8 is a diagram of an example non-conflicting edit to fully-connected large scale spatial data (e.g. a 3D mesh) that may be "trivially" merged. A first region 810 edited by a first client 120, 160 is distinct from a second region 820 which a second client 120, 160 desires to edit. In this example, the first client edits the first region to separate data (e.g., to split a face 840 of set of faces 830 into a set of faces located on the same coordinates, to produce edited faces 850). The second client translates data (e.g., to move vertices 870 of set of faces 860 to a new location further to the right, thereby changing the geometry of the faces to which they belong to produce edited faces 880). The first region and the second region are fully disjoint (i.e. do not intersect), the data edited is distinct (e.g., the set of faces 830 and the set of faces 850 have no common vertices, do not overlap, and are separated by an unchanged an unbroken boundary of faces. As such, the changes can be combined "trivially", for example can simply be cut-and-paste together, to yield a combined result (e.g., faces 890), without the infinite mesh services process 130 having knowledge of exactly what the changes are and independent of the order of execution (e.g., independent of which of the two clients committed the changes first).

Figure 9:
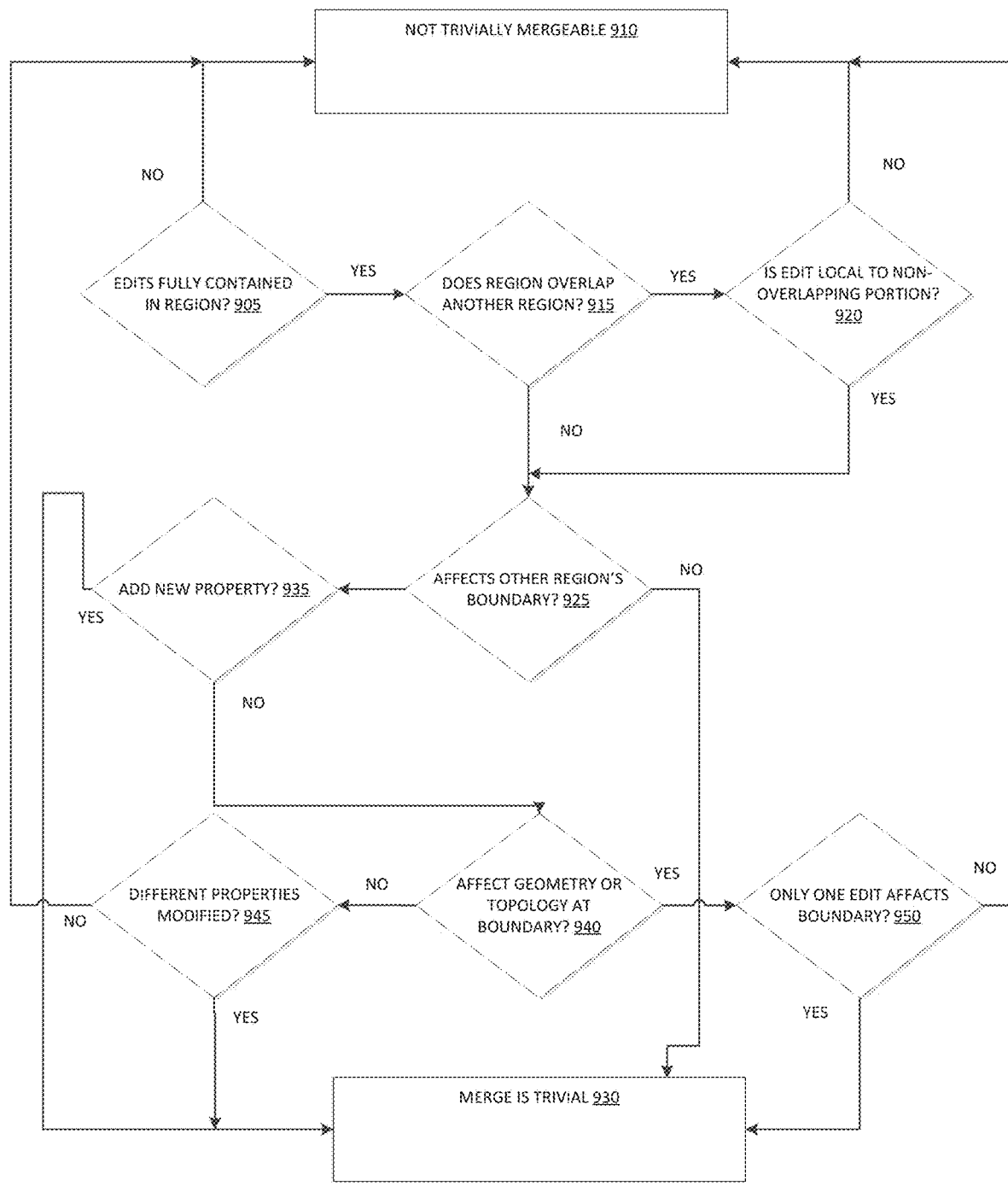
FIG. 9 is a flow diagram of an example sequence of steps that may be performed to determine whether non-conflicting edits to fully-connected large scale spatial data may be "trivially" merged.

FIG. 9 is a flow diagram of an example sequence of steps that may be performed by the infinite mesh services process 130 to determine whether non-conflicting edits to fully-connected large scale spatial data (e.g., a 3D mesh) may be "trivially" merged. At step 905, it is determined whether the edits is fully contained within the region locked by the client. If it is not fully contained, at step 910, it is concluded the edit is not mergeable. If it is fully contained, it is determined at step 915, whether the region locked by the client overlaps a region of another client. Such an overlap may be allowed with region-based locking through the use of sharable region-based locks. If it overlaps, at step 920, it is determined whether the edit is local to the non-overlapping area. If either the regions do not overlap, or if the regions overlap but the edit is local to the non-overlapping portion, execution proceeds to step 925. Otherwise, it is it is concluded the edit is not mergeable at step 910.

Figure 10:
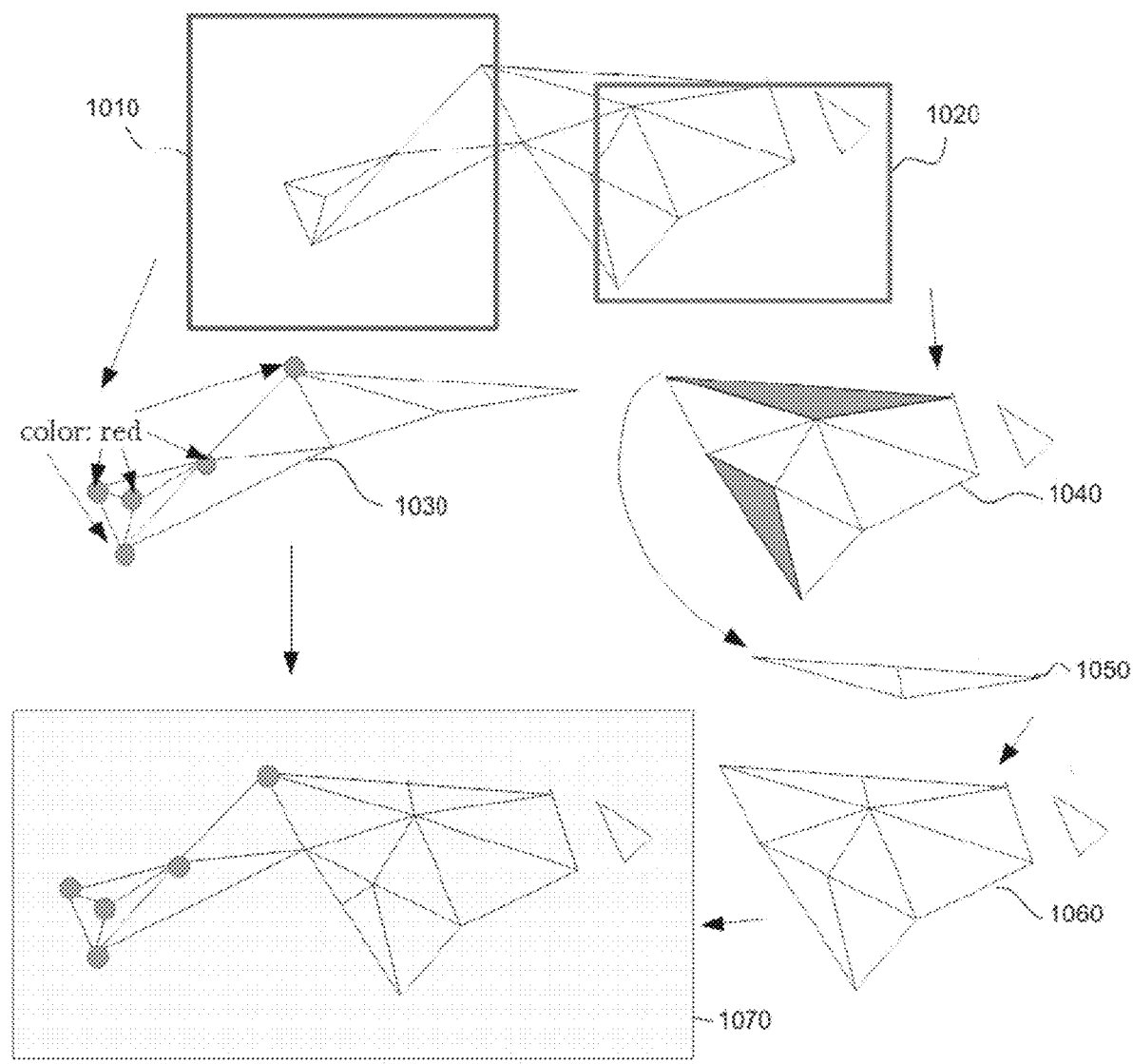
FIG. 10 is a diagram of an example non-conflicting edits to fully-connected large scale spatial data that require "non-trivial" merging because of changes to boundaries.

At step 925, It is determined whether the edit affects another region's boundary (e.g., boundary faces). If not, execution proceeds to step 930, where it is concluded the edit is "trivially" mergeable. If the edit does effect another region's boundary, it is determined at step 935 whether the edit is to add a new property. If so, execution proceeds to step 930, where it is concluded the edit is "trivially" mergeable. If the edit is something other than adding a new property, execution proceeds to step 940, where it is determined whether either the edit or the edits from another client affects geometry or topology at a boundary. If not, at step 945, it is determined whether the edit changes a value of, or deletes, a different property than the edits from another client. If the edit does not change the value of, or deletes, the same property as the edits from another client, execution proceeds to step 930, where it is concluded the edit is "trivially" mergeable. If the edit changes the value of, or deletes, the same property as the edits from another client, at step 910, it is concluded the edit is not mergeable. If so, execution proceeds to step 950 where it is determined whether only one of the edits from the client or another client affects a boundary. If so, execution proceeds to step 930, where it is concluded the edit is "trivially" mergeable. Otherwise, at step 910, it is concluded the edit is not mergeable FIG. 10 is a diagram of an example non-conflicting edits to fully-connected large scale spatial data (e.g., a 3D mesh) that require "non-trivial" merging because of changes to boundaries. In this example, the edits are still compatible, but this depends on the type of changes. A first region 1010 is edited by a first client 120, 160 and a second non-intersecting region 1020 is edited by a second client. In this example, the first client edits the first region to change properties (e.g., adding a "color" property to vertices with a value) of all of the region (e.g., all vertices, including at the boundary) 1030, while the second client desires to redistribute data in the second region (e.g., such that faces are split, including one face at the boundary) 1040. It may be observed that one area (e.g., face) 1050 affected (e.g., split) by the second client includes portions (e.g., vertices) with properties changed by the first client. A merged result should incorporate both changes, however the changes affect the same areas (e.g., at least some of the vertices whose properties are changed are affected by the split). To address this, the second client's changes may be applied first, updating the topology 1060, and, after this, any portions (e.g., vertices) that are still the same are updated with the first client's changes 1070. In this example, the edits are compatible. But in other examples, the results of one edit may influence the results of the other, resulting in a case where it is difficult (or impossible) to merge the edits.

Figure 11:
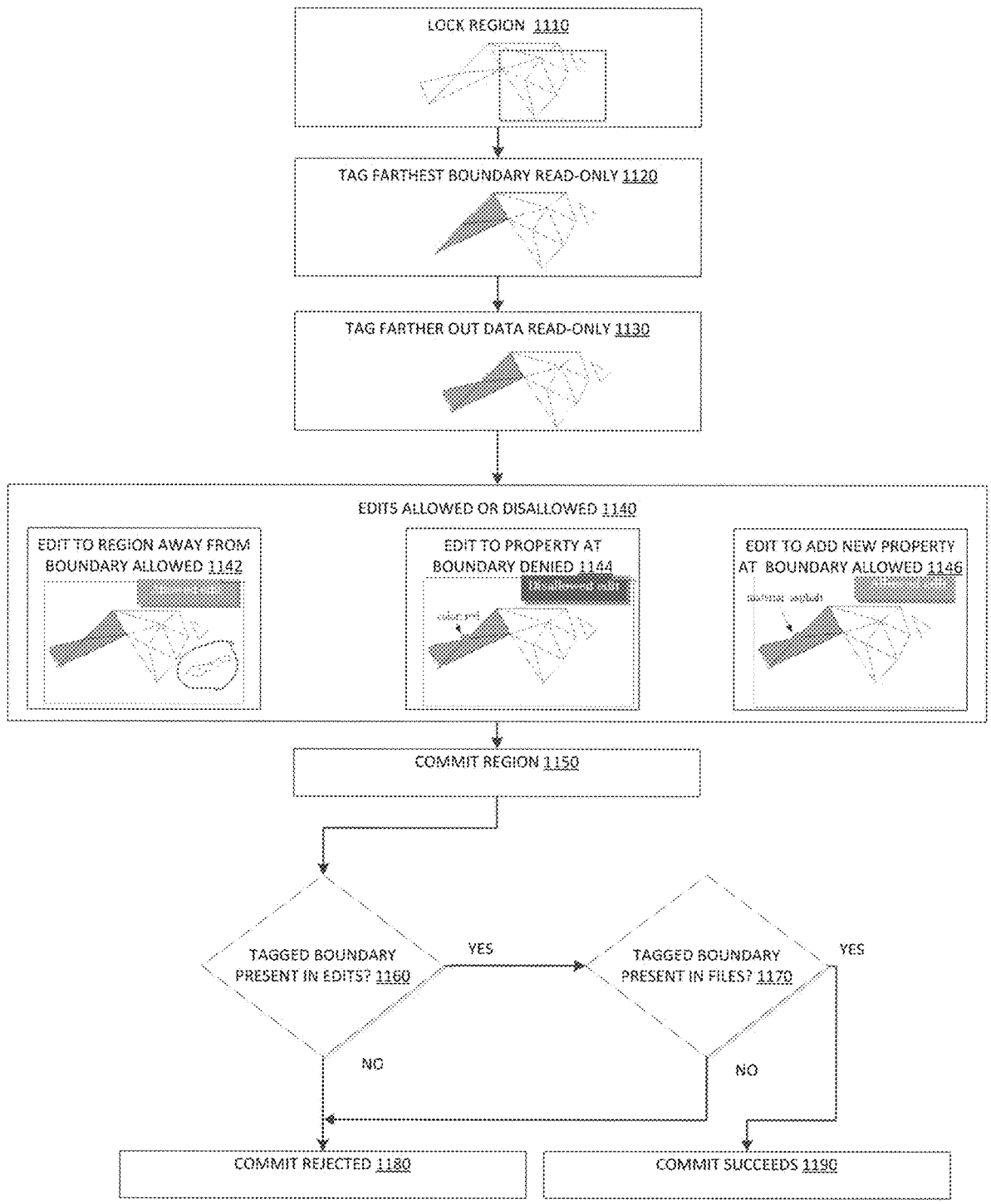
FIG. 11 is a flow diagram of an example sequence of steps that may be performed to prevent non-conflicting edits to fully-connected large scale spatial data that require "non-trivial" merging, thereby ensuring that each merge is a may be "trivially" conducted.

FIG. 11 is a flow diagram of an example sequence of steps that may be performed to prevent non-conflicting edits to fully-connected large scale spatial data (e.g., a 3D mesh) that require "non-trivial" merging, thereby ensuring that each merge is may be "trivially" conducted. The steps of FIG. 11 may be performed by the infinite mesh services process 130, utilizing the ROI locking and management subprocess 132, tile computation engine 134 and the file structure subprocess 136, when not specifically stated to be performed by the client. At step 1110, a region-based lock is placed on a region for a client. At step 1120, in response to a request for data (e.g., a mesh) of the region from the client, the farthest boundary (e.g., the farthest boundary faces) contained within the region are tagged as read-only. At step 1130, data (e.g., faces) further out than this boundary are also tagged as read-only. The client is then returned the requested data including the tags. At step 1140, the client edits the returned data, with individual edits being allowed or disallowed based on whether they attempt to change tagged data (e.g., tagged faces). For example, at sub-step 1142, the client allows an edit on a region away from the boundary (e.g., adding a staircase-like pattern of faces in the region). Alternatively, at sub-step 1144, an edit to change a property at the boundary (e.g., changing a color of a vertex at the boundary) is denied. Conversely, at sub-step 1146, an edit to create a new property at a boundary (e.g., creating a new property "material" for a boundary face and assigning a value of "asphalt" to the new property) is allowed as an edge case, because new properties generally may be merged together as long as they have a default value. At step 1150, A request is received from the client to commit the edits. At steps 1160 and 1170, a check is performed whether a tagged boundary is maintained in both the edits to be committed and the data stored in the files 145. If it is not found in either place, the commit is aborted and a failure case is reported at step 1180. If it is found in both places, the commit succeeds and the edits are applied to the data in the files 145, at step 1190.

Figure 12:
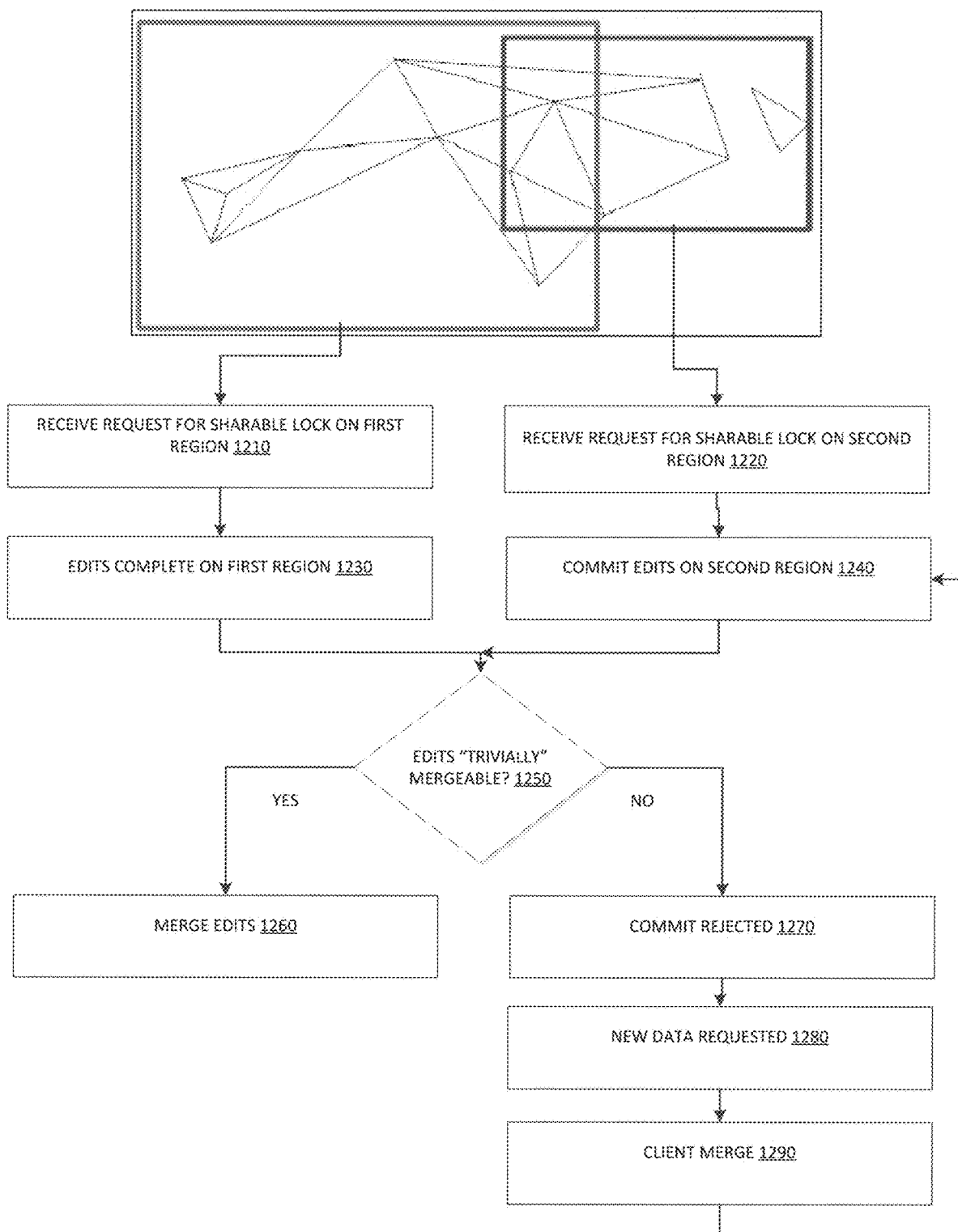
FIG. 12 is a flow diagram of an example sequence of steps that may be performed when there are edits on overlapping regions of fully-connected large-scale spatial data through the use of sharable region-based locks.

It should be remembered, that regions overlapping does not always cause a conflict or require "non-trivial" merging. As mentioned above in reference to FIG. 9, in some cases multiple clients may edit overlapping regions through the use of sharable region-based locks, and such edits may be "trivially" merged if certain conditions are met. FIG. 12 is a flow diagram of an example sequence of steps that may be performed when there are edits on overlapping regions of fully-connected large-scale spatial data (e.g., a 3D mesh) through the use of sharable region-based locks. The steps of FIG. 12 may be performed by the infinite mesh services process 130, utilizing the ROI locking and management subprocess 132, tile computation engine 134 and the file structure subprocess 136, when not specifically stated to be performed by the client. At step 1210, a sharable region-based lock of a first client on a first region is received and granted. While that lock is active, at step 1220, a sharable region-based lock of a second client on a second region that overlaps the first region is received and granted. At step 1230, the edits of the first client on the first region are completed. At step 1240, a request is received from the second client to commit the edits to the second region. At step 1250, a determination is made whether the edits are "trivially" mergeable or not using the process described above in FIG. 9. If the edits are trivially" mergeable, execution proceeds to step 1260 where the edits are merged. If not, execution proceeds to step 1270, where the commit is rejected. To make the edits on the second region acceptable, the second client requests new data, the request for which is received at step 1280. At step 1290, the client merges the new data with its edits according to is own logic, and then execution loops back to step 1240, where the second client re-attempts to commit the edits. On the subsequent attempt, the second client commit will typically succeed.

It should be understood that various adaptations and modifications may be readily made to what is described above, to suit various implementations and environments. While it is discussed above that many aspects of the techniques may be implemented by specific software processes (e.g., of an application stored in a non-transitory electronic device readable medium for execution on one or more processors) or on specific hardware devices, it should be understood that some or all of the techniques may also be implemented by different software on different hardware. In addition to general-purpose computing devices/electronic devices, the hardware may include specially configured logic circuits and/or other types of hardware components.

Above all, it should be understood that the above descriptions are meant to be taken only by way of example.

What is claimed is:

1. A method for editing multi-dimensional spatial data stored in one or more files, comprising:
   placing, by a process of a software application executing on one or more computing systems, a lock for a client on the multi-dimensional spatial data in the one or more files, to prevent conflicting edits;
   receiving, by the process from the client, a request for data of a region of the multi-dimensional spatial data;
   tagging at least a boundary contained within the region as read-only, and returning the requested data and one or more tags to the client;
   editing the returned data, an edit being allowed or disallowed based on satisfying one or more conditions, the one or more conditions including that the edit does not change tagged data, to prevent non-trivially mergeable edits;
   receiving a request from the client to commit an allowed edit; and
   merging the allowed edit with another edit to the multi-dimensional spatial data in the one or more files.

2. The method of claim 1, wherein the lock is a region-based lock on the region for which the client requests data, and the placing further comprises:
   determining whether the region intersects another region of an existing region-based lock, and granting the region-based lock in response to the regions not intersecting.

3. The method of claim 1, wherein the one or more conditions include that the edit it fully contained in the region.

4. The method of claim 1, wherein the one or more conditions include that if the region overlaps another region of another client, the edit is local to a non-overlapping portion of the region.

5. The method of claim 1, wherein the one or more conditions include that if the region overlaps another region of another client, the edit does not affect the another region's boundary.

6. The method of claim 1, wherein the tagging further tags data beyond the farthest boundary as read-only.

7. The method of claim 1, wherein the edit does not change tagged data when no geometry or topology is modified at the boundary.

8. The method of claim 1, wherein the edit does not change tagged data when no existing property is modified at the boundary.

9. The method of claim 1, wherein the edit does not change tagged data when a new property is added at the boundary.

10. The method of claim 1, wherein the merging is a trivial merge that comprises cut-and-pasting the edit with another edit of another client to yield a combined result that is independent of order of execution.

11. The method of claim 1, wherein the multi-dimensional spatial data is a three dimension (3-D) mesh.

12. The method of claim 11, wherein the editing includes at least one of changing part of mesh geometry, part of mesh topology, both part of the mesh geometry and the mesh topology or changing one or more mesh properties of the 3-D mesh.

13. The method of claim 11, wherein the software application is a structure from motion (SfM) photogrammetry application that generates the 3-D mesh based on a set of images of the real-world captured by a camera, and the client performs retouching, reconstruction, texturing or annotating operations upon the 3-D mesh.

14. A computing device comprising:
   a processor; and
   a memory coupled to the processor and configured to store a three-dimensional (3-D) mesh and a process of a structure from motion (SfM) photogrammetry application, the process of the SfM photogrammetry application when executed operable to:
      place a region-based lock for a client on the 3-D mesh in one or more files,
      receive a request from the client for mesh data of a region of the 3-D mesh, the mesh data including a plurality of faces;
      tag at least a subset of faces of the plurality that represent a boundary contained within the region as read-only, and return the requested mesh data and one or more tags to the client,
      commit an edit to the mesh data that satisfies one or more conditions, the one or more conditions including that the edit does not change tagged faces, and
      merge the committed edit with another edit to the 3-D mesh in the one or more files.

15. The computing device of claim 14, wherein the one or more conditions include that the edit is fully contained in the region, the edit is local to a non-overlapping portion of the region if the region overlaps another region of another client, and that the edit does not change tagged faces by modify geometry or topology at the boundary or modifying an existing property at the boundary.

16. A non-transitory electronic-device readable medium having instructions stored thereon, the instructions when executed by one or more electronic devices operable to:
   place a lock for a client on the multi-dimensional spatial data in one or more files;
   receive a request for data of a region of the multi-dimensional spatial data;
   tag at least a boundary contained within the region as read-only, and return the requested data and one or more tags to the client;
   edit the returned data, the edit being allowed or disallowed based on satisfying one or more conditions, the one or more conditions including that the edit does not change tagged data;
   receive a request from the client to commit an allowed edit; and
   merge the allowed edit with another edit to the multi-dimensional spatial data in the one or more files.

17. The non-transitory electronic-device readable medium of claim 16, wherein the lock is a region-based lock on the region for which the client requests data.

18. The non-transitory electronic-device readable medium of claim 16, wherein the one or more conditions include that the edit is fully contained in the region, the edit is local to a non-overlapping portion of the region if the region overlaps another region of another client, and that the edit does not change tagged faces by modify geometry or topology at the boundary or modifying an existing property at the boundary.

19. The non-transitory electronic-device readable medium of claim 16, wherein the multi-dimensional spatial data is a three dimension (3-D) mesh.

20. The non-transitory electronic-device readable medium of claim 16, wherein the edit includes at least one of changing part of mesh geometry of the 3-D mesh, part of the mesh topology, both part of the mesh geometry and mesh topology or changing one or more mesh properties of the 3-D mesh.

21. A method for editing multi-dimensional spatial data stored in one or more files, comprising:

placing, by a software application executing on one or more computing systems, a lock for a client on the multi-dimensional spatial data in one or more files;

receiving, by the software application, a request for data of a region of the multi-dimensional spatial data;

tagging at least a boundary contained within the region as read-only, and returning the requested data and one or more tags to the client;

receiving, by the software application, a request from the client to commit an edit to the returned data that satisfies one or more conditions, the one or more conditions including that the edit does not change tagged data, and merging the edit with another edit to the multi-dimensional spatial data in the one or more files.

22. The method of claim 21, wherein the one or more conditions include that the edit is fully contained in the region, the edit is local to a non-overlapping portion of the region if the region overlaps another region of another client, or that the edit does not change tagged faces by modify geometry or topology at the boundary or modifying an existing property at the boundary.

23. The method of claim 21, wherein the multi-dimensional spatial data is a three dimension (3-D) mesh and the edit includes at least one of changing part of mesh geometry of the 3-D mesh, part of the mesh topology, both part of the mesh geometry and mesh topology or changing one or more mesh properties of the 3-D mesh.

* * * * *

UNITED STATES PATENT AND TRADEMARK OFFICE
CERTIFICATE OF CORRECTION

Page 1 of 2

PATENT NO. : 10,930,087 B2
APPLICATION NO. : 16/514585
DATED : February 23, 2021
INVENTOR(S) : Elenie Godzaridis et al.

It is certified that error appears in the above-identified patent and that said Letters Patent is hereby corrected as shown below:

In the Specification

Column 2, Line 13 reads:
"pendently of the data. The edit sets describes a series of"
Should read:
--pendently of the data. The edit sets describe a series of--

Column 4, Line 33 reads:
"have another numbers of dimensions and such dimensions"
Should read:
--have another number of dimensions and such dimensions--

Column 7, Line 46 reads:
"preformed. At step 640, the cells are written to the files 145,"
Should read:
--performed. At step 640, the cells are written to the files 145,--

Column 8, Line 53 reads:
"edits is fully contained within the region locked by the"
Should read:
--edits are fully contained within the region locked by the--

Column 9, Line 1 reads:
"edit is "trivially" mergeable. If the edit does effect another"
Should read:
--edit is "trivially" mergeable. If the edit does affect another--

Column 10, Line 51 reads:
"new data with its edits according to is own logic, and then"

Signed and Sealed this
Twenty-fifth Day of February, 2025

Coke Morgan Stewart
*Acting Director of the United States Patent and Trademark Office*

Should read:
--new data with its edits according to its own logic, and then--

In the Claims

Column 12, Line 64 reads:
"three dimension (3-D) mesh."
Should read:
--three-dimension (3-D) mesh.--